United States Patent [19]

Teramachi

[11] 4,427,240

[45] Jan. 24, 1984

[54] ENDLESS LINEAR BALL BEARING

[76] Inventor: Hiroshi Teramachi, 34-8 Higashi-Tamagawa, 2-chome, Setagaya-ku, Tokyo, Japan, 158

[21] Appl. No.: 460,949

[22] Filed: Jan. 25, 1983

[30] Foreign Application Priority Data

Feb. 13, 1982 [JP] Japan .................................. 57-21835
Jul. 21, 1982 [JP] Japan ........................... 57-109494[U]

[51] Int. Cl.³ ............................................ F16C 29/06
[52] U.S. Cl. .................................................. 308/6 C
[58] Field of Search .............. 308/6 R, 6 A, 6 B, 6 C, 308/3 R, 3 A

[56] References Cited

U.S. PATENT DOCUMENTS

4,253,709 3/1981 Teramachi ........................... 308/6 C
4,296,974 10/1981 Teramachi ........................... 308/6 C
4,363,526 12/1982 Teramachi ........................... 308/6 C

*Primary Examiner*—John Petrakes
*Assistant Examiner*—David J. Werner
*Attorney, Agent, or Firm*—George B. Oujevolk

[57] ABSTRACT

An endless ball bearing arrangement for relative longitudinal movement between a table having a longitudinal edge portion and a longitudinal side portion, one of said edge or side portions is movable with respect to the other portion. The arrangement consists of a pair of elongated straight metal block bearing bodies located in one of said longitudinal portions facing the opposite longitudinal portion. The front part of these bearing bodies has a W-shaped cross section laying on its side. The outer arms of the W-shape extend towards the top and bottom of the bearing bodies with the center of the W-shape pointing towards the back of the bearing bodies. A pair of bearing first races in the bearing bodies extend parallel at the junction of the arms of the W-shape and the center part, across the length of the bearing bodies. These are the races for the loaded balls. Second races for unloaded balls parallel to the first races are disposed away from said first races in the bearing bodies. Disposed over the front part is a retainer also of W-shape sized to fit over the first races, means are at opposite ends of the retainer to scoop up balls. End plates with U-shaped turning grooves are provided for guiding balls. And, race bars with bearing third races are provided in the opposite portion to cooperate with the first races.

3 Claims, 23 Drawing Figures

FIG. 23

ENDLESS LINEAR BALL BEARING

BACKGROUND OF THE INVENTION

The present invention relates to an endless linear ball bearing comprising a bearing block having a fixing section and a bearing section and to an endless linear ball bearing unit comprising bearing blocks each of which is disposed opposite to one side of a movable table and provided with bearing races of a circular arc, and race bars each having bearing races for receiving the working balls which roll along the bearing races of the bearing block and disposed on the bed opposite to the bearing blocks respectively.

BRIEF REVIEW OF THE PRIOR ART

Figure 1:
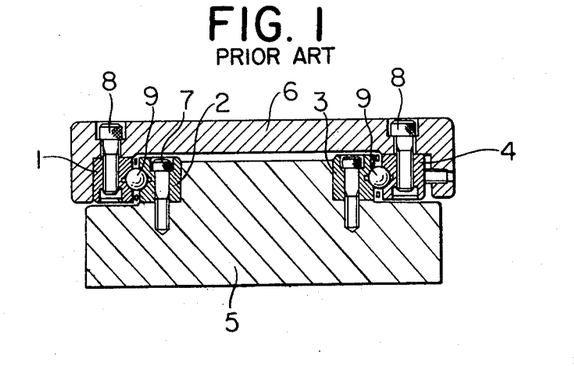
FIGS. 1 and 2 are sectional views of known bearing units.

In a conventional limited linear ball bearing unit as shown in FIG. 1, bearing race bars 2 and 3 and bearing race bars 1 and 4 are fastened to the right and the left sides of a bed 5 and to the opposite inner sides of a movable table 6, respectively, by means of fastening bolts 7 and 8 and ball guides 9 are interposed between the bearing race bars 1 and 2 and between the bearing race bars 3 and 4.

Figure 2:
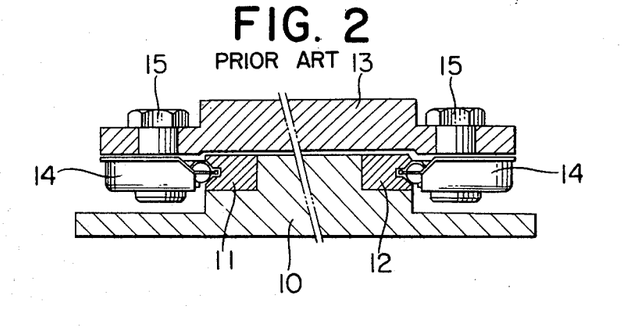

An endless linear ball bearing unit of a thin and compact construction as shown in FIG. 2 is known. The endless linear ball bearing unit comprises bearing race bars 11 and 12 and ball guide bearings 14 attached to the right and the left sides of a bed 10 and to the respective sides of a table 13, respectively, at the respective fixed positions by means of bolt and nut assemblies 15.

Figure 3:
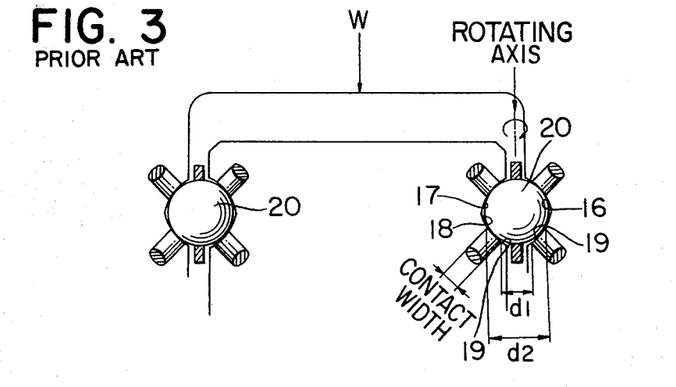
FIGS. 3 and 4 are explanetory representations illustrating the state of the contact surfaces when a preload is applied to known double-Gothic arch type linear ball bearings.
Figures 4, 5:
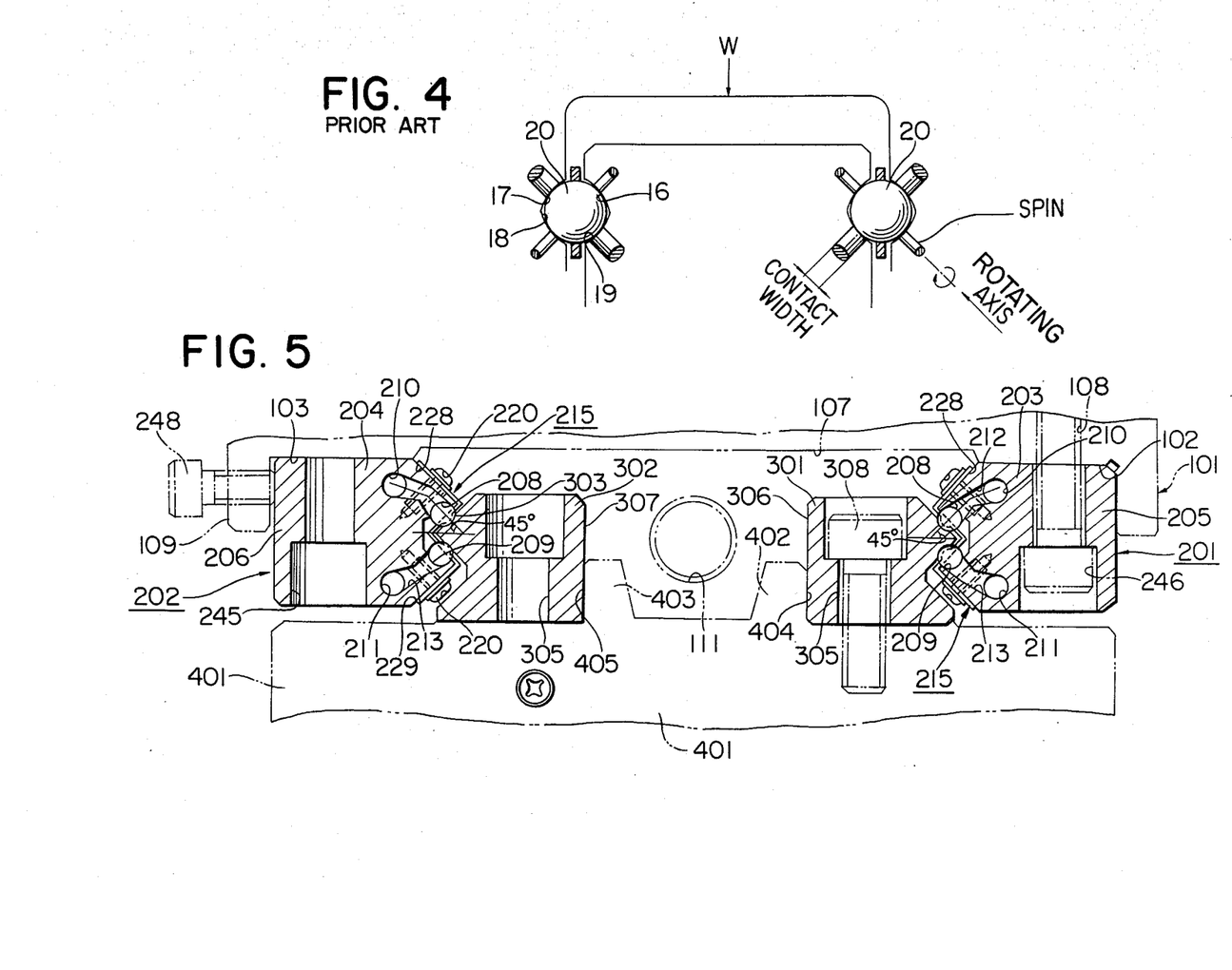
FIG. 5 is a partial sectional view of endless linear ball bearings of the present invention and a unit incorporating the same endless linear ball bearings.

However, in such conventional limited linear ball bearing unit and endless linear ball bearing unit, the bearing race groove is formed of four circular arcs 16, 17, 18 and 19 as shown in FIGS. 3 and 4, therefore, the ball 20 is supported at four contact points and a large difference between $d_1$ and $d_2$ causes the elastic deformation of the bearing balls, so that differential slip is brought about when the linear ball bearing unit is preloaded or when the linear ball bearing unit having no gap is loaded. When a downward load W is applied to the linear ball bearing having a gap as shown in FIG. 4, the elastic deformation of the ball 20 occurs to cause the spinning, namely, the rotatory slip, of the ball 20, so that irregular wear of the members is caused by a large friction almost corresponding to a slip resistance and thereby the life of the linear ball bearing unit is reduced.

Furthermore, since the ball 20 is in contact with abovementioned bearing races at four points and hence the elastic deformation of the ball is impeded, the warp of the fixing surface or the error in the accuracy of the race bars can not be absorbed and hence smooth motion of the linear ball bearing can not be attained.

Accordingly, high precision finishing is the essential condition for such conventional linear ball bearing units, therefore, those conventional linear ball bearing units have defficiencies in that high precision bearing races have to be formed in a highly rigid bed and a high precision race bar must be employed.

SUMMARY OF THE INVENTION

Briefly stated, the present invention provides an endless linear ball bearing comprising a bearing block provided with guide holes for the idle balls in the bearing section thereof and a bearing block having no guide hole for the idle bearing, which bearing blocks are attached to a movable table opposite to the respective sides of the movable table to absorb the machining errors and to easily apply a preload to the linear ball bearing unit by pressing one of the bearing blocks with bolts, wherein each bearing race for the working balls is formed in the shape of a circular arc at a position on a straight line inclining at an angle of 45° to a horizontal line to prevent the differential slip of the working balls, and the right and the left bearing blocks are formed in the same configuration to reduce the cost through reduction in the working processes.

Another object of the present invention is to provide an endless linear ball bearing capable of absorbing the machining errors and the positioning errors between the bearing bodies disposed opposite to the respective sides of a movable table, of preventing the differential slip of the working balls by applying a preload to the bearing bodies to eliminate gaps between the working balls and the bearing races and by forming the bearing races for the working balls in the shape of a circular arc at the respective positions on straight lines inclined at an angle of 45° to a horizontal line, and of producing the endless linear ball bearing at a reduced cost by forming the end plates attached to the bearing body of a plastics material and by reducing the working processes.

The function and the effect of the endless linear ball bearing of the present invention are as follows. Since the bearing races formed in the bearing blocks attached opposite to the opposite sides of a movable table and in the race bars have the shape of a circular arc, the working balls running between the bearing races are in contact with those bearing races at two points along the direction of the contact angle and are allowed to deform elastically, so that a wide contact width is formed, the small warp of the fixing surfaces can be absorbed by the deformation of the balls and unimpeded smooth motion of the endless ball bearing is attainable.

Furthermore, since each retainer is formed in an M-shaped cross section and parallel right and left slits each of a width smaller than the diameter of the ball are formed in the inner inclined sides, the retainer is capable of both retaining the working balls and guiding the working balls smoothly, so that the construction of the endless linear ball bearing is simplified without deteriorating the strength of the component members and the manufacturing cost can be reduced.

Further objects, features, functions and effects of the present invention will become apparent from the detailed description of the preferred embodiment of the present invention when taken in combination with the drawings, in which:

BEST MODE OF CARRYING OUT THE INVENTION

Embodiment 1

Referring to FIGS. 5 to 13, a movable table 101 is movable longitudinally of a bed 401 and stepped parts 102 and 103 for attaching bearing blocks 201 and 202 are formed in the respective inner sides of both sides of the movable table longitudinally of the movable table as shown by imaginary lines. The stepped parts 102 and 103 defines the backside 107 of the movable table 101 corresponding to the upper side of the movable table 101. The bearing blocks 201 and 202 are formed by cutting a shaft formed by drawing in a necessary configuration. The bearing blocks 201 and 202 comprise bearing bodies 203 and 204 and fixing sections 205 and 206, respectively. Bearing races 208 and 209 for guiding working balls 207 are formed in the bearing bodies 203 and 204. The bearing races 208 and 209 are formed in parallel to each other and one over the other at positions on straight lines inclining at an angle of 45° to a horizontal line passing through the center axes of the bearing blocks bearing bodies 203 and 204, respectively. The bearing races 208 and 209 are formed in the shape of a circular arc for two-point contact. The most preferable radius of curvature of the bearing races 208 and 209 is approximately 52 to 53% of the diameter of the ball.

Figures 10, 11, 12:
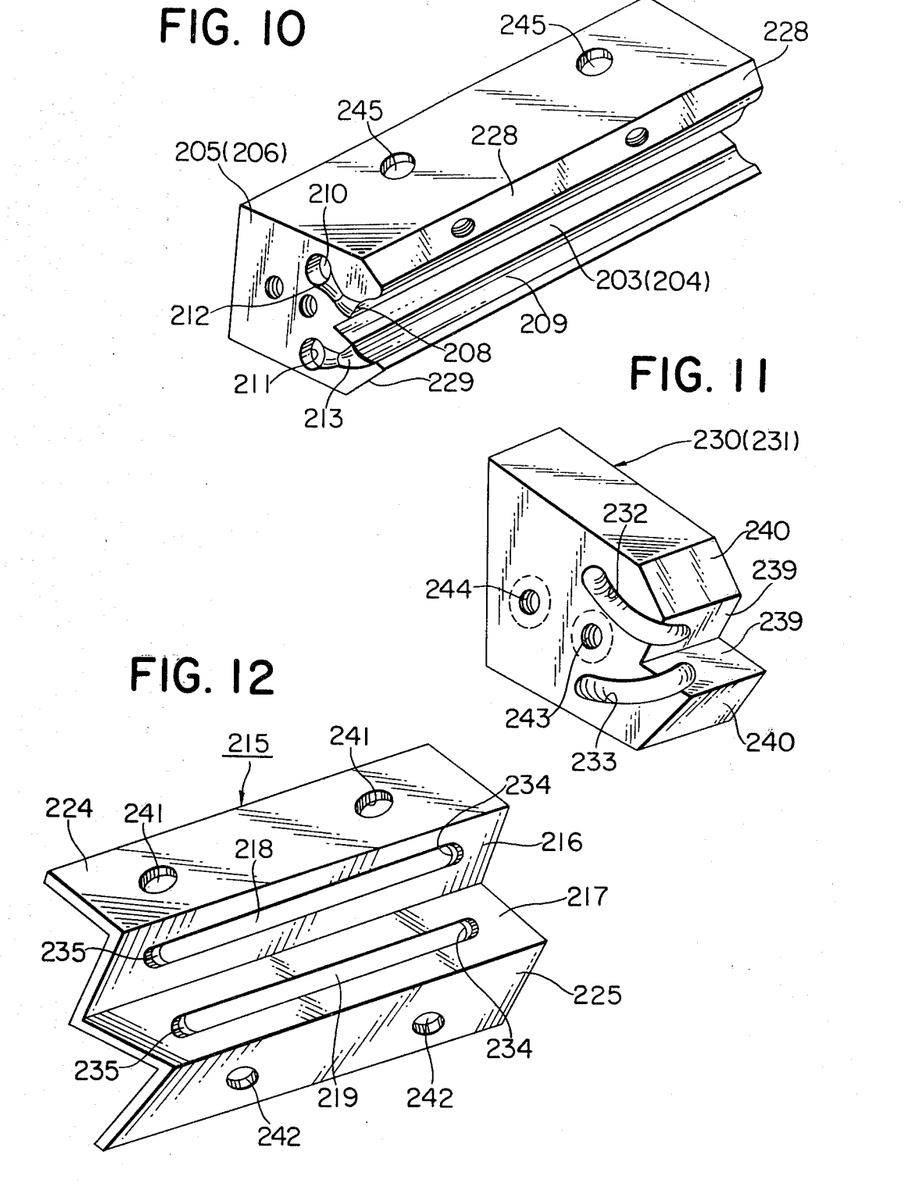
FIG. 10 is a perspective view of the bearing block.
FIG. 11 is a perspective view of the end plate.
FIG. 12 is a perspective view of the retainer to be attached to the bearing body.

Parallel guide holes 210 and 211, each having a diameter which is slightly greater than the diameter of the ball, for guiding idle balls are formed one over the other at an optional interval along a straight line extending perpendicularly to the horizontal line passing through the center axis of the bearing bodies 203 and 204. U-shaped turning grooves 212 and 213 for guiding working balls 207 running along the bearing races 208 and 209 for working balls into the guide holes 210 and 211 for guiding idle balls (FIG. 10).

A retainer 215 of a W-shaped cross section is punched out integrally from a steel sheet. Parallel slits 218 and 219 of a width which is slightly smaller than the diameter of the ball 207 are formed in the inner inclined sides 216 and 217 of the retainer 215 corresponding to the bearing races 208 and 209 of the bearing body 203 along the longitudinal direction. Tongues 235 and 235 for scooping up the balls 207 are formed at the respective opposite ends of the slits 218 and 219 (FIG. 12). The outer inclined sides 224 and 225 of the retainer 215 are fastened to the right and the left inclined surfaces 228 and 229 of the bearing body 203 by means of screws 220. Through holes 241 and 242 are formed in the outer inclined sides 224 and 225 of the retainer 215 for receiving the screws 220 therethrough.

End plates 230 and 231 are formed integrally by molding a plastics material or by die-casting an alloy. Inner inclined sides 239 and outer inclined sides 240 are formed in one side of the end plate, while an fixing part 243 is formed on the other side thereof. U-shaped turning grooves 232 and 233 for guiding the working balls from the bearing races 208 and 209 of the bearing body 205 (206) into the guide holes 210 and 211 or guiding idle balls from the guide holes 210 and 211 into the bearing races 208 and 209 are formed in the end plate 230 (231). The end plates 230 and 231 are fastened to the respective longitudinal opposite ends of the bearing bodies 203 and 204 by means of bolts 236. A plurality of through holes 244 are formed in the end plate 230 for receiving the bolts 236 therethrough.

Through holes 245 are formed in the fixing sections 205 and 206 of the bearing blocks 201 and 202 for receiving bolts 246 (only one of the bolts 246 is shown) therethrough. The bearing blocks 201 and 202 are fastened to the inside of the opposite sides of the movable table 101 by screwing in the bolts 246 into threaded holes 108 (only one of the threaded holes 108 is shown) formed in the movable table 101.

Bolts 248 (only one of them is shown) screwed in internal threads 110 formed in the side wall 109 of the movable table 101 are screwed in to press the bearing block 202 toward the race bar 302 for preloading the rows of the balls.

Race bars 301 and 302 are fastened to the bed 401 at the respective predetermined positions therein by means of bolts 308 inserted through through holes 305 drilled through the race bars 301 and 302 at optional intervals. The bearing races 303 and 304 of the race bars 301 and 302 are formed in the race bars 301 and 302 so as to correspond to the bearing races 208 and 209 of the bearing bodies 203 and 204. The bearing races 303 and 304 of the race bars 301 and 302, similarly to the bearing races 208 and 209, are formed in the shape of a circular arc to allow two-point contact. The inner side walls 306 and 307 of the race bars 301 and 302 are placed in abutment against the vertical walls 404 and 405 of positioning ridges 402 and 403.

A nut, not shown, is attached to the backside of the movable table 101 and is engaged with a ball screw 111 for forward and backward motion according to the rotation of the ball screw 111.

Figure 6:
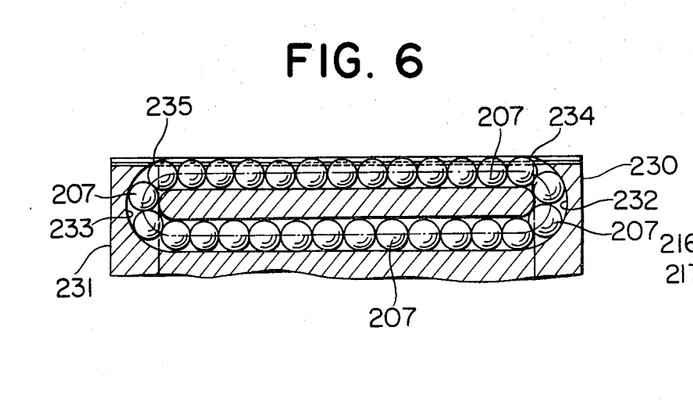
FIG. 6 is a sectional view illustrating the retainer and the running state of a plurality of balls running along the slits of the retainer.
Figure 7:
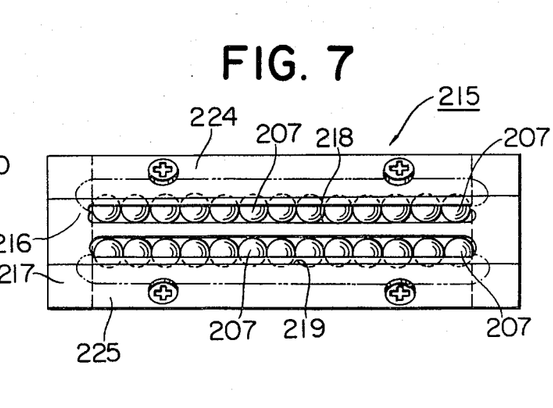
FIG. 7 is a plan view illustrating the connection of the retainer and the end plates.
Figure 8:
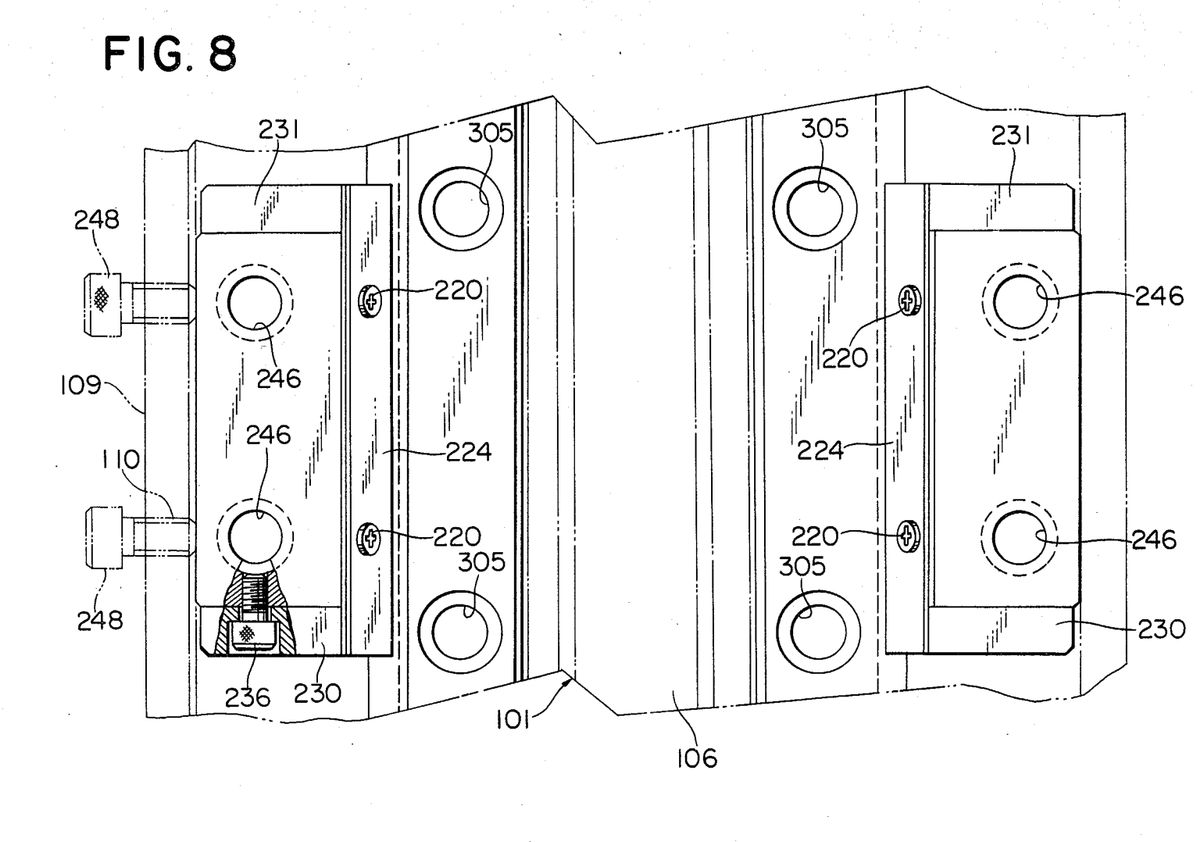
FIG. 8 is a plan view of an endless linear ball bearing unit according to the present invention.
Figure 9:
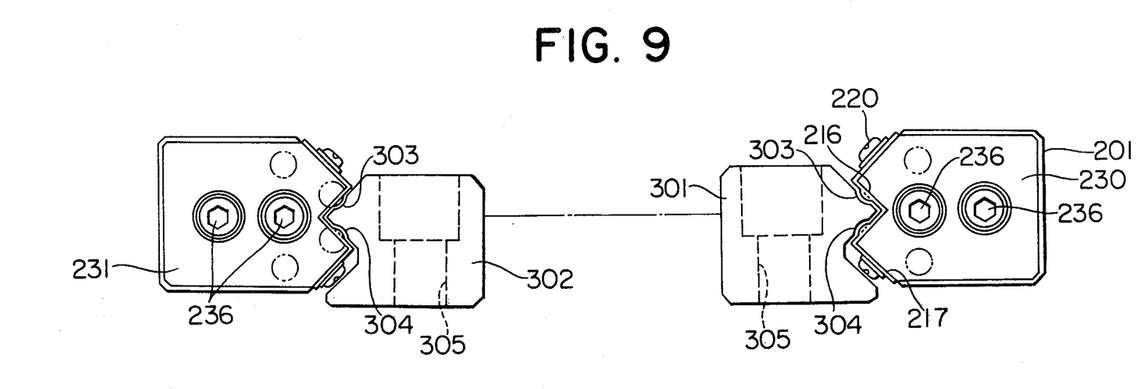
FIG. 9 is a side elevation of an endless linear ball bearing unit according to the present invention.

In operation, when the ball screw 111 is turned to move the movable table 101 forward or backward, the working balls 207 roll between the bearing bodies 203 joined to the opposite sides of the movable table 101 and the race bars 301 and 302 and circulate smoothly through the U-shaped turning grooves 232 and 233 of the end plates 230 and 231 and through the guide holes 210 and 211 for guiding the idle balls (FIGS. 5, 6 and 7).

Figures 13, 14:
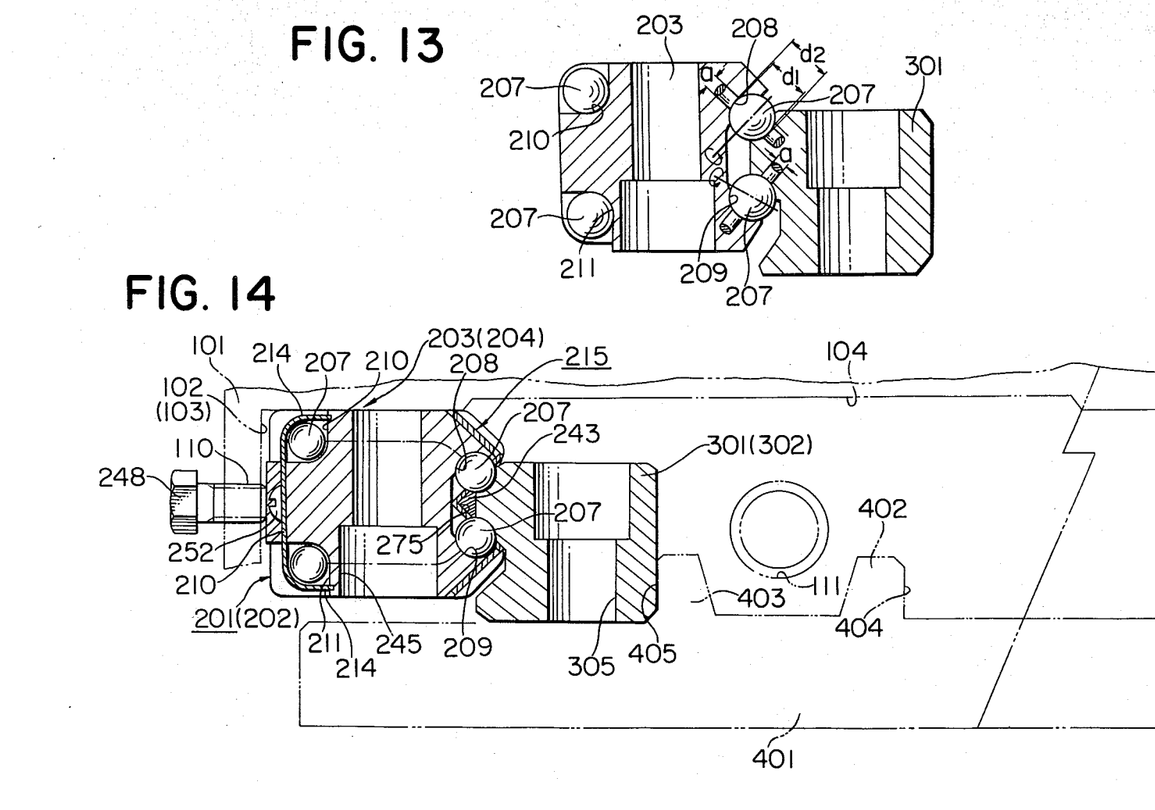
FIG. 13 is an explanetory representation illustrating the state of the contact surfaces of the bearing of the present invention when a preload or a load is applied thereto.
FIG. 14 is a partial sectional sectional view of another embodiment of an endless linear ball bearing according to the present invention.

The working balls are in angular contact with the bearing races and when the working balls are preloaded or a load of any direction is applied to the working balls, the working balls 207 are in two-point contact along the direction of the contact angle, so that the difference between $d_1$ and $d_2$, which is the cause of the differential slip, is reduced and satisfactory rolling motion of the working balls is allowed.

When an increased load is applied to the working balls, the balls are deformed elastically as the balls are in two-point contact with the bearing races and an increased contact width a is provided so that the the rigidity is increased. Furthermore, since the radius of curvature of the bearing races is 52 to 53% of the diameter of the ball, the load capacity of the bearing races is increased.

Still further, forming the right and the left bearing bodies in a mirror image one another by drawing a square bar is appropriate to mass production and is a remarkably effective measure of cost reduction, while the right and the left bearing bodies are interchangeable. Still further, since the right and the left bearing bodies are attached to the movable table individually, the endless linear ball bearing of the present invention can be employed irrespectively of the size of the movable table.

Furthermore, the symmetrical W-shaped configuration of the retainer facilitates the manufacture of the retainer and provides an increased rigidity.

Embodiment 2

The second embodiment of the present invention will be described hereunder with reference to FIGS. 14 to 23.

In the second embodiment, the respective fixing sections of bearing blocks 201 and 202 are formed in the respective central parts of bearing bodies 203 and 204 and U-shaped turning grooves for turning the running direction of the balls are formed at the respective longitudinal opposite ends of the bearing bodies 203 and 204 with end plates and semicylindrical guide members.

The same parts with those of the Embodiment 1 are designated by the same reference numerals and the description thereof will be omitted.

Figure 17:
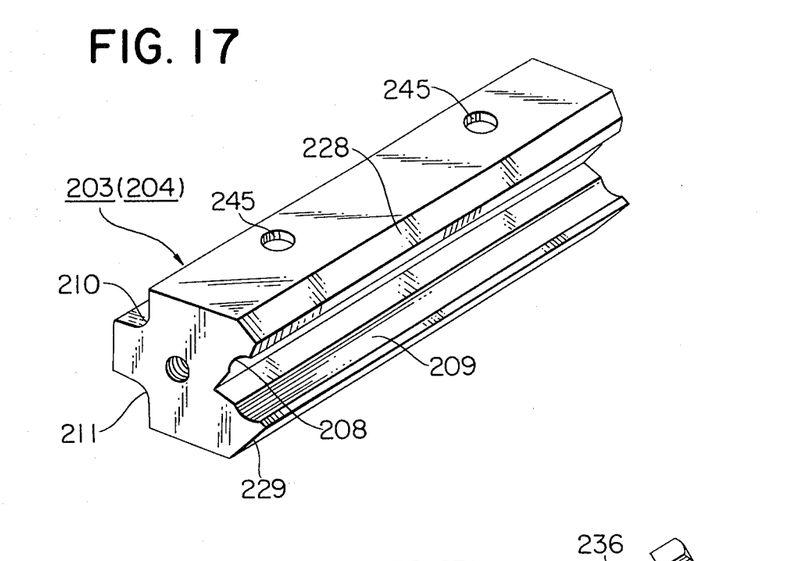
FIG. 17 is a perspective view of the bearing body.
Figure 18:
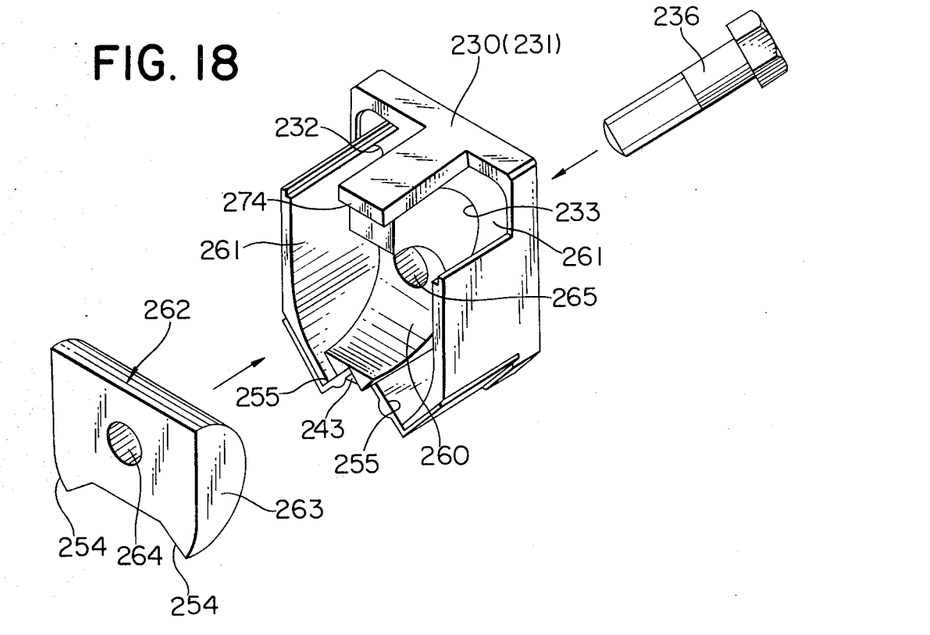
FIG. 18 is an exploded perspective view of the end plate to be attached to the bearing body.
Figure 19:
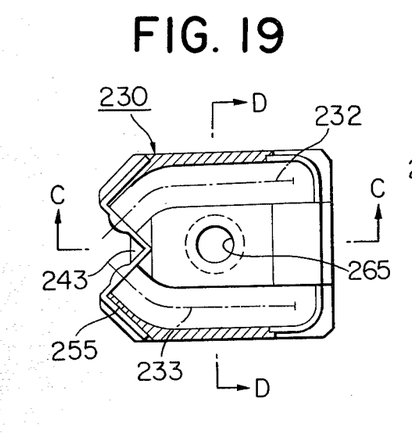
FIG. 19 is a front elevation partly sectional of the end plate.
Figure 20:
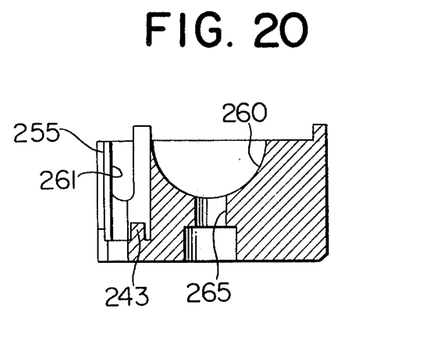
FIG. 20 is a sectional view taken along line C—C of FIG. 19.
Figure 21:
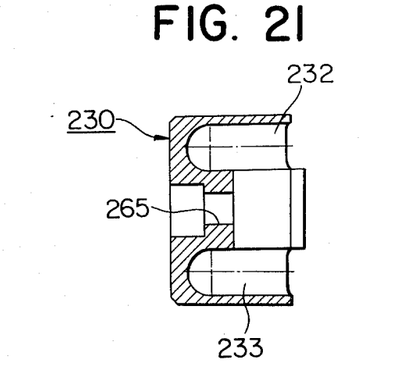
FIG. 21 is a sectional view taken along line D—D of FIG. 19.

Parallel bearing races 208 and 209 for guiding working balls 207 and parallel U-shaped guide holes 210 and 211 are formed in the respective upper parts and the lower parts of one side and the other side, respectively of the bearing bodies 203 and 204. End plates 230 and 231 are formed integrally by molding a plastics material or by die-casting an alloy. A first semicircular recess 260 is formed in the inner central part of the end plate. Second semicircular recesses 261 having a radius greater than that of the first semicircular recess 260 are formed in concentric and above and below or on the right side and on the left side of the first semicircular recess 260. The second semicircular recesses 261 are located so that the working balls 207 running along the bearing bodies 203 and 204 can be guided from the bearing races 208 and 209 into the U-shaped guide grooves 210 and 211 or from the U-shaped guide holes 210 and 211 into the bearing races 208 and 209. U-shaped turning grooves for turning the running direction of the balls 207 by securely fitting the semicylindrical guide member 262 in the first recess 260 with the opposite side walls in contact with the end faces of the second recesses 261. The end plates 230 and 231 are fastened together with the semicylindrical guide member 262 to the longitudinal opposite ends of the bearing body 203 by means of bolts 236.

Figure 15:
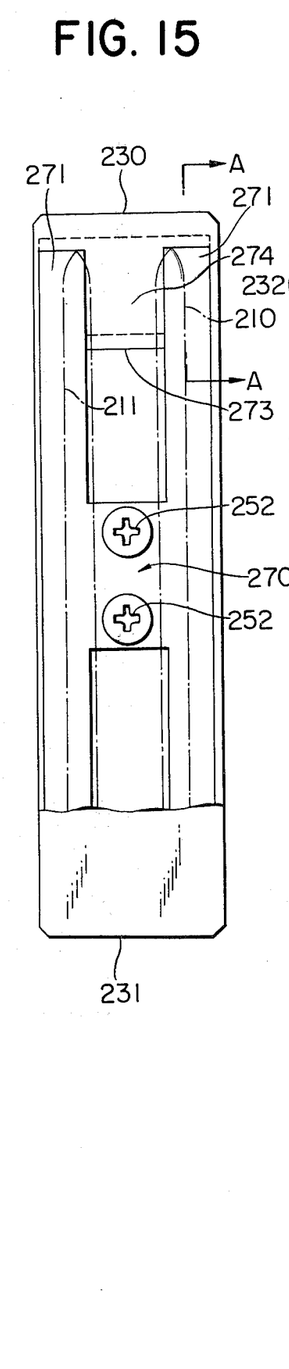
FIG. 15 is a plan view of the bearing body with an idle ball cover attached thereto.
Figure 16:
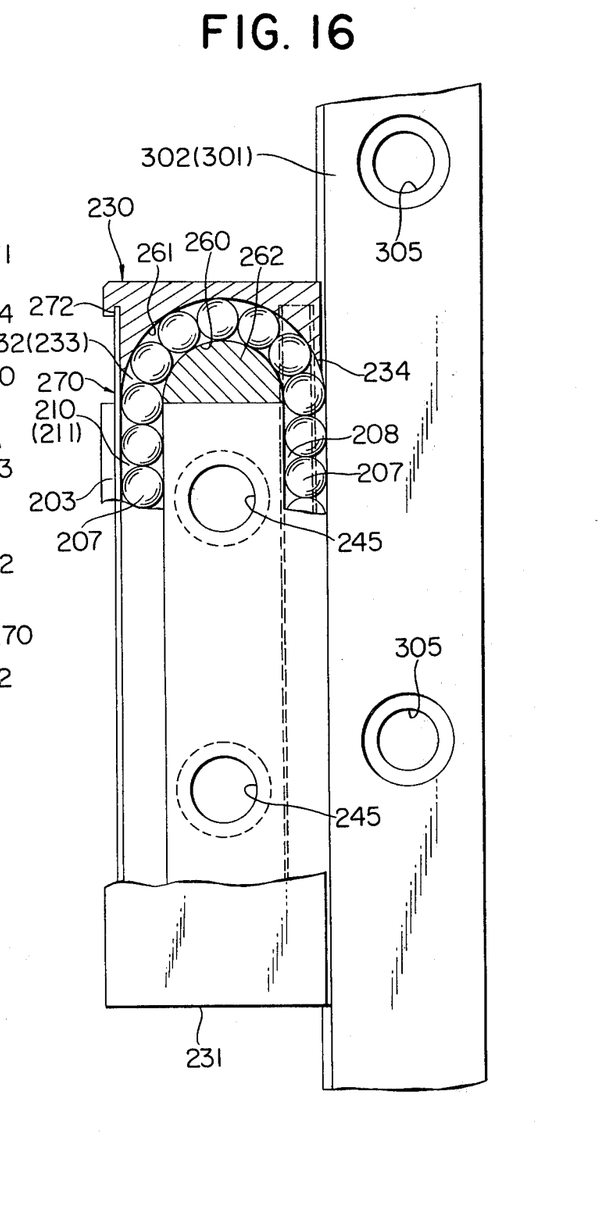
FIG. 16 is a sectional view taken along line A—A of FIG. 4.

An idle ball cover 270 of a practically U-shaped cross section is attached to the backside of the bearing body 203 so as to cover the U-shaped guide holes formed in the upper and the lower parts of the backside of the bearing body 203. The respective edges of the upper and the lower flat sides 271 of the cover 270 are inserted into narrow elongate grooves 272 formed in the respective side walls of the U-shaped guide holes 210 and 211. The respective projections 274 of the end plates 230 and 231 fit in the recesses 273 formed at the longitudinal opposite ends of the cover 270. The cover 270 is fastened to the backside of the bearing body 203 by means of screws 252.

Retainer holders 243 formed in the end plates 230 and 231 are formed in a practically triangular cross section so that the retainer holders are disposed in abutment against the V-shaped bottom part of the retainer 215 placed over the bearing races 208 and 209 of the bearing body 203 and fitted in the W-shaped grooves of the end plates 230 and 231.

Figure 22:
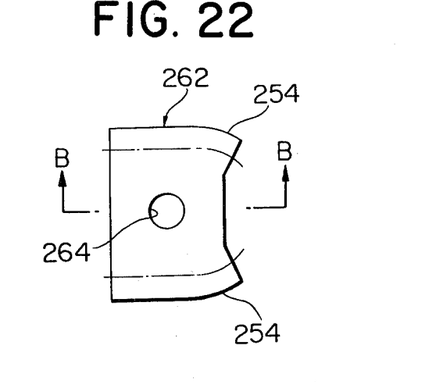
FIG. 22 is a front elevation a semicylindrical guide member.
Figure 23:
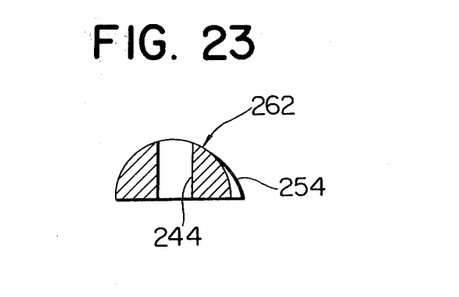
FIG. 23 is a sectional view taken along line B—B of FIG. 22.

A through hole 264 is formed in the semicylindrical guide member 262. Curved surfaces 254 for guiding the working balls 207 are formed in the semicylindrical guide 262 on both sides of the lower end thereof.

A through hole 265 is formed in the end plate 230 for receiving a bolt 236 therethrough. Through holes 245 are formed in the bearing bodies 203 and 204. The bearing bodies 203 and 204 are fastened to the movable table by inserting bolts 246 through the through holes 245 and screwing those bolts 245 into internal threads 103 formed in the movable table along both sides thereof (FIG. 5). The bearing body 203 can be pressed toward the race bar 301 by fastening bolts 248 screwed in internal threads 110 formed in the side wall 109 of the movable table 101, in order to apply a preload to the balls (FIG. 11).

I claim:
1. An endless ball bearing arrangement for relative longitudinal movement between a table having a longitudinal edge portion and a longitudinal side portion alongside said table, one of said portions being movable with respect to the other portion, said arrangement comprising in combination:
 (a) a pair of elongated straight metal block bearing bodies (203, 204) each having a flat top and a flat bottom, said bearing bodies also having a back part, said bearing bodies being located in one of said longitudinal portions facing the opposite longitudinal portions;
 (b) said metal block bearing bodies also having a front part of W-shape cross-section, said W-shape laying on one side, said W-shape having outer arms extending towards said top and bottom parts, a center pointing towards the back and a junction of said outer arms and said center;
 (c) a pair of bearing first races (208, 209), in said bearing bodies (203, 204) extending parallel longitudinally at said junction on both sides of said center, across the length of said bearing bodies, said first races serving as the races for loaded balls, the radius of curvature of the races being only slightly greater than one-half the diameter of balls which are to be loaded therein, said first races being inclined at an angle of about 45° to the horizontal towards said W-shape center, second races for unloaded balls parallel to said first races disposed away from said first races in said bearing bodies;

(d) a retainer (215) of W-shape sized to fit over the W-shaped front part with parallel slits (218, 219) disposed over the races, the width of the slits being slightly smaller than the diameter of the balls to be used, tongues (235) for scooping up balls (207) formed at opposite ends of the slits;

(e) end plates (230, 231) with U-shaped turning grooves (232, 233) for guiding balls; and, (f) race bars (301, 302) with bearing third races (303, 304) corresponding to the first races (208, 209) disposed oppposite the retainer slits (218, 219) in the other of said table portions.

2. An arrangement as claimed in claim 1, wherein said outer arms of the W-shape have outer ends, said second races extending longitudinally along said outer ends.

3. An arrangement as claimed in claim 1 wherein said bearing body has said second races longitudinally defined across said back part.

* * * * *